United States Patent
Savakis et al.

(10) Patent No.: US 6,535,636 B1
(45) Date of Patent: Mar. 18, 2003

(54) METHOD FOR AUTOMATICALLY DETECTING DIGITAL IMAGES THAT ARE UNDESIRABLE FOR PLACING IN ALBUMS

(75) Inventors: Andreas E. Savakis, Rochester, NY (US); Alexander C. Loui, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/274,645

(22) Filed: Mar. 23, 1999

(51) Int. Cl.[7] .................................................. G06K 9/34
(52) U.S. Cl. ........................ 382/173; 359/670; 382/170
(58) Field of Search ................................ 382/162–176; 358/450–487; 359/666–670

(56) References Cited

U.S. PATENT DOCUMENTS

| | | | | |
|---|---|---|---|---|
| 4,794,531 A | * | 12/1988 | Morishita et al. ............ 358/132 |
| 5,224,177 A | * | 6/1993 | Doi et al. .................... 382/168 |
| 5,600,574 A | * | 2/1997 | Reitan ......................... 702/185 |
| 5,739,924 A | * | 4/1998 | Sano ........................... 358/487 |
| 5,832,111 A | * | 11/1998 | Florent ........................ 382/171 |
| 5,864,411 A | * | 1/1999 | Norris ......................... 358/527 |
| 6,081,388 A | * | 6/2000 | Widl ........................... 359/666 |

* cited by examiner

Primary Examiner—Jingge Wu
(74) Attorney, Agent, or Firm—David M. Woods

(57) ABSTRACT

A method for automatically classifying a digital image as a dud, the method comprises the steps of receiving the digital image; determining individually or any combination of sharpness,;contrast, noise, and exposure of the digital image; determining a threshold individually for sharpness, contrast, noise, and exposure, or a threshold for any combination of sharpness, contrast, noise, and exposure which determined threshold or thresholds determines if the image is classified as a dud; and classifying the image as a dud based on the determination of the previous step.

15 Claims, 4 Drawing Sheets

METHOD FOR AUTOMATICALLY DETECTING DIGITAL IMAGES THAT ARE UNDESIRABLE FOR PLACING IN ALBUMS

CROSS-REFERENCE TO RELATED APPLICATIONS

The present application is related to U. S. application Ser. No. 09/163,618, filed Sep. 30, 1998, by Alexander C. Loui et. al., and entitled, "A METHOD FOR AUTOMATICALLY CLASSIFYING IMAGES INTO EVENTS", and also related to. U. S. application Ser. No. 09/211,762, filed Nov. 20, 1998, by Alexander C. Loui et. al., and entitled, "A METHOD FOR AUTOMATICALLY COMPARING CONTENT OF IMAGES FOR CLASSIFICATION INTO EVENTS."

FIELD OF THE INVENTION

The invention relates to the field of digital image processing and, more particularly, to digital image processing having automatic detection of images that are undesirable for placing in albums, i.e., duds.

BACKGROUND OF THE INVENTION

Pictorial images are often placed in albums manually by individuals. When the pictorial images are available in digital form, the albuming process can be automated by computer software. During the automated albuming process, it is desirable to detect dud photographs for possible elimination from the album. Duds are defined as images that are not worth keeping, and therefore not worth putting in an album. Current methods for detecting duds include visually inspecting each photograph. However, this method is obviously time consuming and labor intensive.

Consequently, a need exists for detecting duds in automatic albuming.

SUMMARY OF THE INVENTION

The present invention is directed to overcoming one or more of the problems set forth above. Briefly summarized, according to one aspect of the present invention, the invention resides in a method for automatically classifying a digital image as a dud, the method comprising the steps of receiving the digital image; determining individually or any combination of sharpness, contrast, noise, and exposure of the digital image; determining a threshold individually for sharpness, contrast, noise, and exposure, or a threshold for any combination of sharpness, contrast, noise, and exposure which determined threshold or thresholds determines if the image is classified as a dud; and classifying the image as a dud based on the determination of the previous step.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, the present invention will be described in the preferred embodiment as a software program. Those skilled in the art will readily recognize that the equivalent of such software may also be constructed in hardware.

Still further, as used herein, computer readable storage medium may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
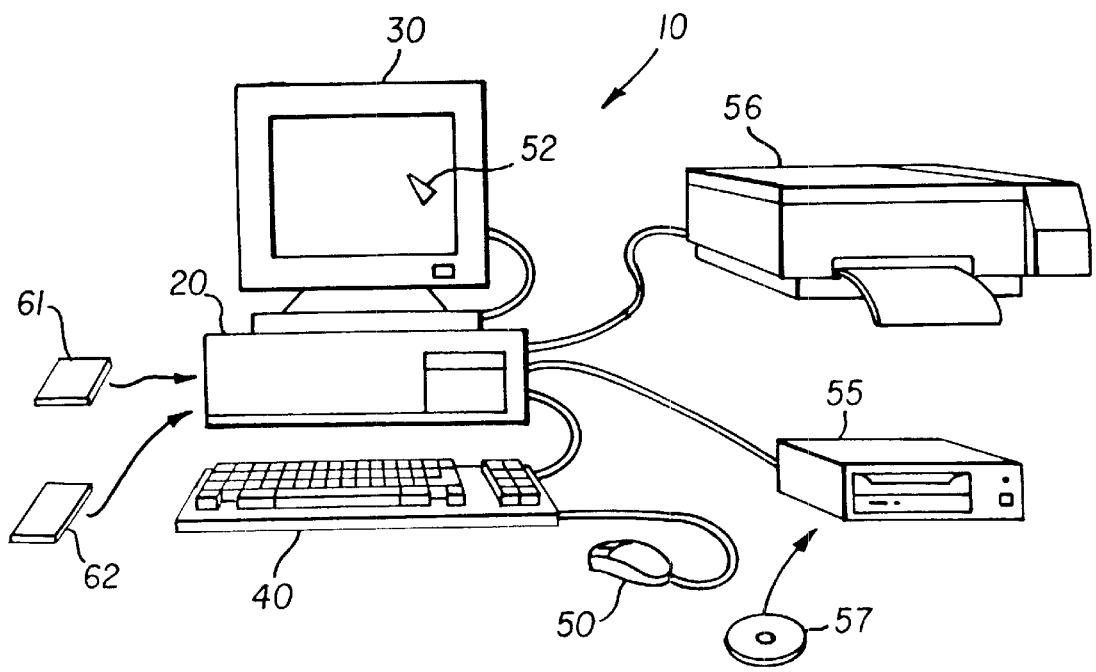
FIG. 1 is a perspective view of a computer system for implementing the present invention.

Referring to FIG. 1, there is illustrated a computer system 10 for implementing the present invention. Although the computer system 10 is shown for the purpose of illustrating a preferred embodiment, the present invention is not limited to the computer system 10 shown, but may be used on any electronic processing system. The computer system 10 includes a microprocessor-based unit 20 for receiving and processing software programs and for performing other processing functions. A display 30 is electrically connected to the microprocessor-based unit 20 for displaying user-related information associated with the software. A keyboard 40 is also connected to the microprocessor based unit 20 for permitting a user to input information to the software. As an alternative to using the keyboard 40 for input, a mouse 50 may be used for moving a selector 52 on the display 30 and for selecting an item on which the selector 52 overlays, as is well known in the art.

A compact disk-read only memory (CD-ROM) 55 is connected to the microprocessor based unit 20 for receiving software programs and for providing a means of inputting the software programs and other information to the microprocessor based unit 20 via a compact disk 57, which typically includes a software program. In addition, a floppy disk 61 may also include a software program, and is inserted into the microprocessor-based unit 20 for inputting the software program. Still further, the microprocessor-based unit 20 may be programmed, as is well know in the art, for storing the software program internally. A printer 56 is connected to the microprocessor-based unit 20 for printing a hardcopy of the output of the computer system 10.

Images may also be displayed on the display 30 via a personal computer card (PC card) 62 or, as it was formerly known, a personal computer memory card international association card (PCMCIA card) which contains digitized images electronically embodied in the card 62. The PC card 62 is ultimately inserted into the microprocessor based unit 20 for permitting visual display of the image on the display 30.

Figure 2:
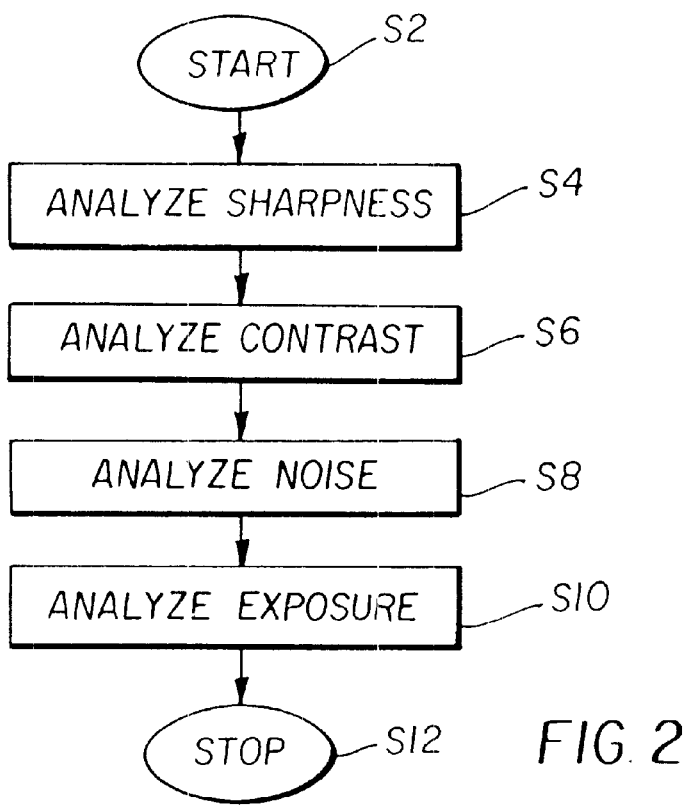
FIG. 2 is a flowchart illustrating an overview of a software program of the present invention.
Figure 3:
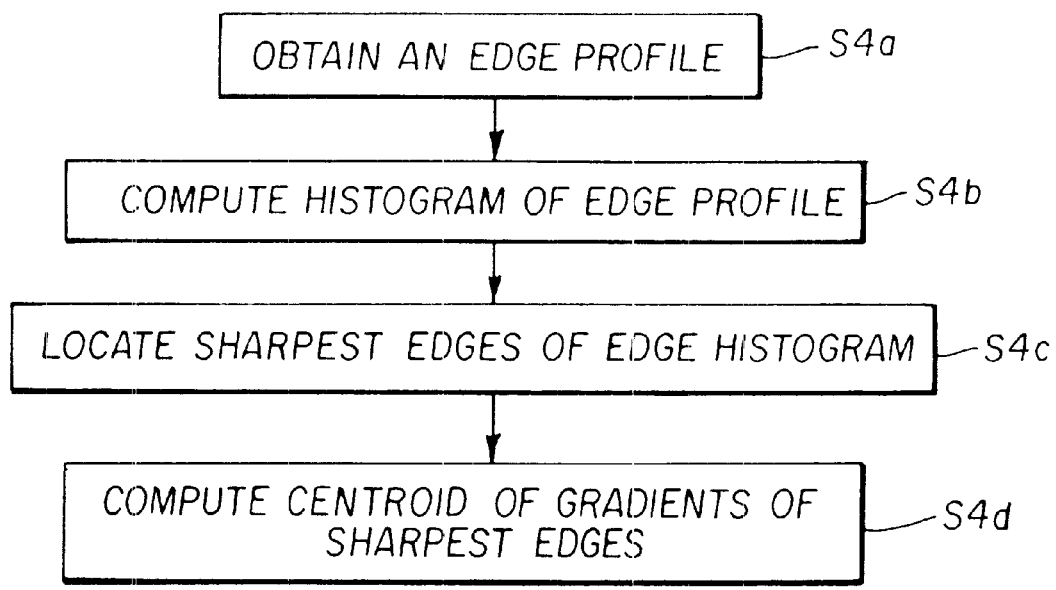
FIG. 3 is a flowchart illustrating a detailed portion of FIG. 2.

Referring to FIG. 2, a flowchart is shown for illustrating an overview of the software program of the present invention. In this regard, the software is initiated S2 and several factors are analyzed. It is instructive to note that the four steps described below need not be performed in the exact order as described below, as those skilled in the art will readily recognize. Still further, each of the steps will be described in detail in after the describing the overview. First, the sharpness of the image is analyzed S4 for determining its sharpness. Then the digital image is analyzed for determining its contrast S6, noise S8 and a exposure S10.

In regard to step S4 of analyzing the sharpness, sharpness is the opposite of defocus and can be characterized by the point spread function (PSF) or the modulation transfer function (MTF) of the imaging system. First, an edge profile of the image is obtained S4a by computing the absolute value of the Laplacian. Then, a histogram of the edge profile is formed S4b and the values that lie above the $90^{th}$ percentile represent the sharpest edges of the image S4c. Next, an average (centroid) of the gradients of the sharpest edges, as determined in the previous step, is computed S4d. The average gradient is the measure of sharpness.

This measure is appropriate only if the entire image is out of focus. If only part of the image is out-of-focus and another part is in focus, the results will be affected by the image area that is in focus.

Figure 4:
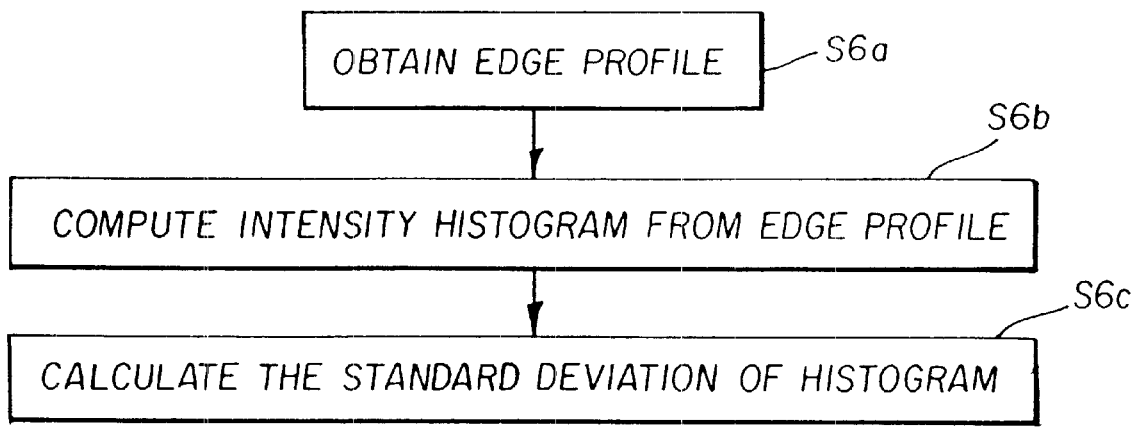
FIG. 4 is a flowchart illustrating another detailed portion of FIG. 2.
Figure 5:
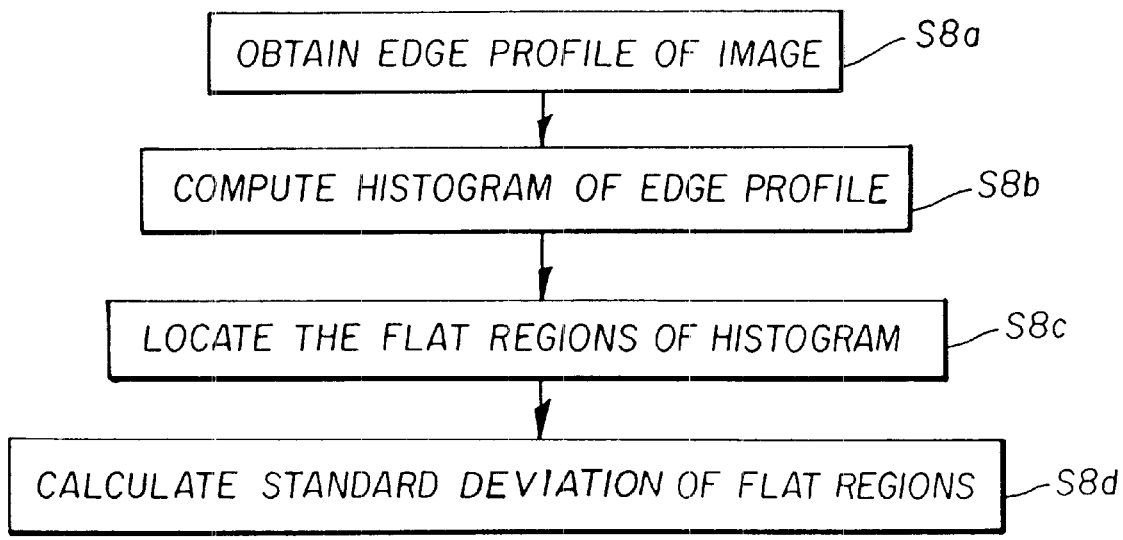
FIG. 5 is a flowchart illustrating still another detailed portion of FIG. 2.

In regard to step S6 of analyzing the contrast, the details of this step may by found in U.S. Pat. No. 5,822,453. Referring to FIG. 4, these steps are summarized as the following. First, the edge profile of the image is obtained S6a by computing the absolute value of the Laplacian. An image intensity histogram from pixels on the edges of the image is formed S6b. The standard deviation of the histogram is calculated S6c. The contrast measure is the standard deviation of the above histogram.

Figure 6:
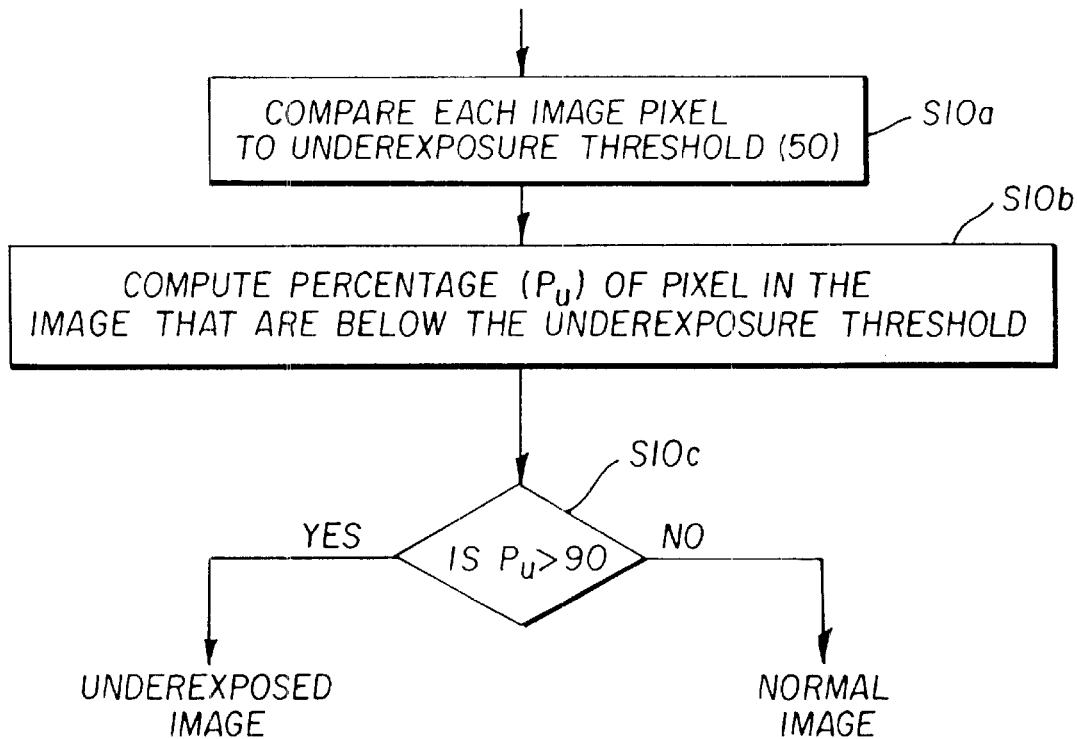
FIG. 6 is also a flowchart illustrating a detailed portion of FIG. 2.

In regard to step S8 of analyzing the noise, the details are disclosed in U.S. pat. application Ser. No. 08/822,722. Referring to FIG. 6, these steps are summarized as the following. First, an edge profile of the image is obtained by computing the absolute value of the Laplacian S8a. Then, a histogram of the edge profile is formed S8b and the values that lie below the $10^{th}$ percentile represent the flat regions of the image S8c. Next the standard deviation of the image intensity in the flat regions, as determined in the previous step, is computed S8d. The noise measure is the standard deviation over the entire image.

In regard to the step S10 of analyzing the exposure, the overall brightness of an image is an indication of overexposure or underexposure. Referring to FIG. 6, Each pixel of the image is compared to an underexposure threshold (preferably 50) S10a. The percentage of pixels in the image that are below the underexposure threshold is computed S10b. If the above percentage is larger than a percentage threshold (preferably 90%) S10c, then the image is underexposed.

Figure 7:
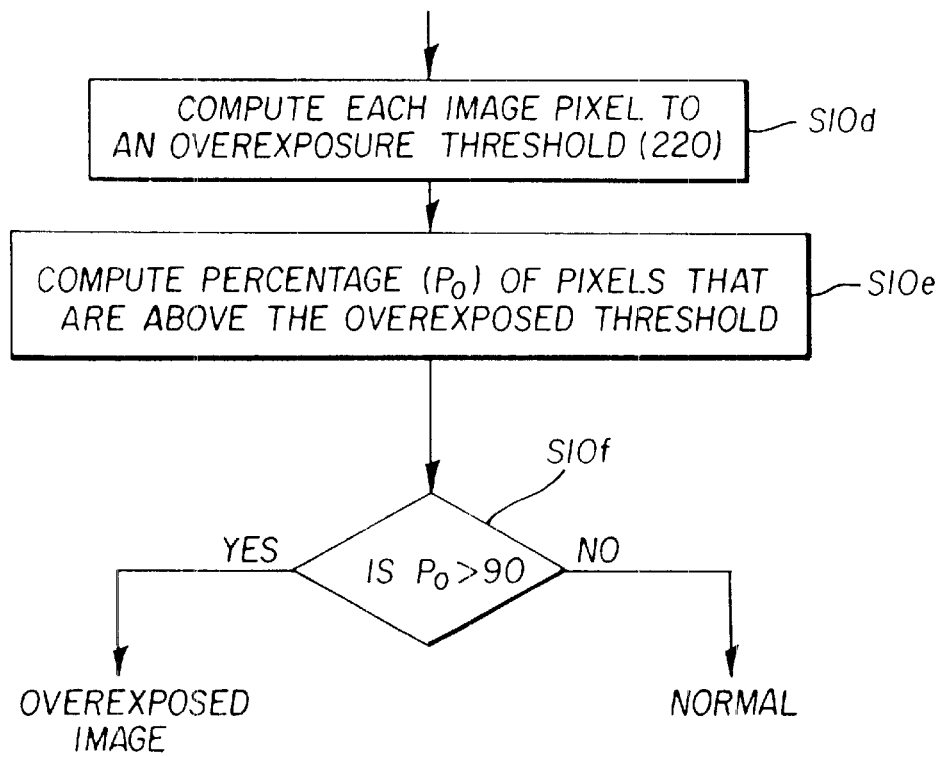
FIG. 7 is still further a flowchart illustrating a detailed portion of FIG. 2.

Referring to FIG. 7, Each pixel of the image is compared to an overexposure threshold (preferably 220) S10d. The percentage of pixels in the image that are above the overexposure threshold is computed S10e. If the above percentage is larger than a percentage threshold (preferably 90%) S10f, then the image is overexposed.

Dud detection may be based on any of the above-described measures using either of three different approaches. First, in a single feature classifier, each measure is thresholded independently to obtain the duds based on that measure. Preferably, the thresholds are 650 for sharpness, 75 for contrast, 30 for noise, and 90 for exposure. A second multi-feature regression technique is to combine all of the objective measures to obtain an overall image quality estimate, which is then thresholded, preferably at 40, for dud detection. Finally, the objective measures may be used as inputs to a multi-feature classifier that is trained to detect duds.

The overall image quality of an image is represented by a parameter Qa. Since the objective measures are computed and available, they are used as predictors for Qa by forming a linear combination of them where the linear coefficients are preferably (0.0097, −0.349, 2.6417, −0.2587) for sharpness, contrast, noise and exposure respectively.

What is claimed is:

1. A method for automatically classifying a digital image as a dud, the method comprising the steps of:
   (a) receiving the digital image;
   (b) determining individually the sharpness, contrast, noise, and exposure of the digital image;
   (c) determining a threshold individually for sharpness, contrast, noise, and exposure, which determined threshold or thresholds determines if the image is classified as a dud;
   (d) determining an overall image quality parameter for the digital image by forming a linear combination of the sharpness, contrast, noise and exposure thresholds; and
   (e) classifying the image as a dud based on the determination of the overall image quality parameter in step (d).

2. The method as in claim 1, wherein the determining the sharpness includes the steps of:
   obtaining an edge profile;
   computing a histogram from the edge profile;
   locating predetermined edges of the edge histogram; and
   computing a centroid of gradients of the predetermined edges.

3. The method as in claim 1, wherein the step of determining the contrast includes the steps of:
   obtaining an edge profile;
   computing an intensity histogram from the edge profile; and
   calculating a standard deviation of the histogram.

4. The method as in claim 1, wherein the step of determining the noise includes the steps of:
   obtaining an edge profile;
   computing a histogram from the edge profile; and
   locating flat regions of the histogram; and calculating a standard deviation of the flat regions.

5. The method as in claim 1, wherein the step of determining the exposure includes the steps of:
   comparing each image pixel to either an overexposure or underexposure threshold;
   computing a percentage of pixels that are either above the overexposure threshold or below the underexposure threshold; and
   determining the overexposure or underexposure based on the computed percentage.

6. A system for automatically classifying a digital image as a dud, the system comprising:
   (a) means for receiving the digital image;
   (b) means for determining individually the sharpness, contrast, noise, and exposure of the digital image;
   (c) means for determining a threshold individually for sharpness, contrast, noise, and exposure, which determined threshold or thresholds determines if the image is classified as a dud;
   (d) means for generating an overall image quality parameter for the digital image by forming a linear combination of the sharpness, contrast, noise and exposure thresholds; and (e) means for classifying the image as a dud based on the overall image quality parameter.

7. The system as in claim 6, wherein the determining the sharpness means further comprises:
   means for obtaining an edge profile;
   means for computing a histogram from the edge profile;
   means for locating predetermined edges of the edge histogram; and
   means for computing a centroid of gradients of the predetermined edges.

8. The system as in claim 6, wherein the determining the contrast means further comprises:
   means for obtaining an edge profile;
   means for computing an intensity histogram from the edge profile; and
   means for calculating a standard deviation of the histogram.

9. The system as in claim 6, wherein the determining the noise means further comprises:
   means for obtaining an edge profile;
   means for computing a histogram from the edge profile; and
   means for locating flat regions of the histogram; and calculating a standard deviation of the flat regions.

10. The system as in claim 6, wherein the determining the exposure means further comprises:
    means for comparing each image pixel to either an overexposure or underexposure threshold;
    means for computing a percentage of pixels that are either above the overexposure threshold or below the underexposure threshold; and
    means for determining the overexposure or underexposure based on the computed percentage.

11. A computer program product for automatically classifying a digital image as a dud, comprising: computer readable storage medium having a computer program stored thereon for performing the steps of:
    (a) receiving the digital image;
    (b) determining individually the sharpness, contrast, noise, and exposure of the digital image;
    (c) determining a threshold individually for sharpness, contrast, noise, and exposure, which determined threshold or thresholds determines if the image is classified as a dud;
    (d) determining an overall image quality parameter for the digital image by forming a linear combination of the sharpness, contrast, noise and exposure thresholds; and
    (e) classifying the image as a dud based on the determination of the overall image quality parameter in step (d).

12. The computer program product as in claim 11, wherein the step of determining the sharpness includes the steps of:
    obtaining an edge profile;
    computing a histogram from the edge profile;
    locating predetermined edges of the edge histogram; and
    computing a centroid of gradients of the predetermined edges.

13. The computer program product as in claim 11, wherein the step of determining the contrast includes the steps of:
    obtaining an edge profile;
    computing an intensity histogram from the edge profile; and
    calculating a standard deviation of the histogram.

14. The computer program product as in claim 11, wherein the step of determining the noise includes the steps of:
    obtaining an edge profile;
    computing a histogram from the edge profile; and
    locating flat regions of the histogram; and calculating a standard deviation of the flat regions.

15. The computer program product as in claim 11, wherein the step of determining the exposure includes the steps of:
    comparing each image pixel to either an overexposure or underexposure threshold;
    computing a percentage of pixels that are either above the overexposure threshold or below the underexposure threshold; and
    determining the overexposure or underexposure based on the computed percentage.

* * * * *